US011951058B2

(12) United States Patent
Dickenson

(10) Patent No.: US 11,951,058 B2
(45) Date of Patent: Apr. 9, 2024

(54) NECK THERAPY DEVICE AND METHOD

(71) Applicant: Scott Dickenson, North Wales, PA (US)

(72) Inventor: Scott Dickenson, North Wales, PA (US)

( * ) Notice: Subject to any disclaimer, the term of this patent is extended or adjusted under 35 U.S.C. 154(b) by 302 days.

(21) Appl. No.: 16/691,856

(22) Filed: Nov. 22, 2019

(65) Prior Publication Data

US 2021/0154078 A1 May 27, 2021

(51) Int. Cl.
*A61H 1/00* (2006.01)
*A61H 1/02* (2006.01)

(52) U.S. Cl.
CPC .... *A61H 1/0229* (2013.01); *A61H 2201/1611* (2013.01); *A61H 2201/1664* (2013.01); *A61H 2201/1671* (2013.01); *A61H 2201/1676* (2013.01); *A61H 2203/0468* (2013.01); *A61H 2203/0475* (2013.01)

(58) Field of Classification Search
CPC ............ A63B 21/4045; A63B 21/4049; A63B 21/4003; A63B 23/025; A63B 23/0238; A61G 13/121; A61H 2001/0203; A61H 2001/0233; A61H 1/0296; A61H 1/0292; A61H 1/02; A61H 1/022; A61H 1/0229; A61H 1/0218; A61H 2001/0207; A61H 1/003; A61H 1/005; A61F 5/046; A61F 5/048; A61F 5/37; A61F 5/3707; A61F 5/3761; A61F 5/05883; A61F 5/05891
USPC ........................................................... 602/36
See application file for complete search history.

(56) References Cited

U.S. PATENT DOCUMENTS 1,750,549 A * 3/1930 John .................. A63B 22/0087 482/130
3,705,579 A 12/1972 Morini et al.
3,771,518 A * 11/1973 Greissing ............. A61H 1/0222 606/243
4,210,134 A 7/1980 Okazaki et al.
4,537,393 A 8/1985 Kusch
4,593,684 A 6/1986 Graham
4,706,953 A 11/1987 Graham
4,785,800 A 11/1988 Stilson
5,306,232 A * 4/1994 Whitmyer .............. A61G 5/121 602/17
5,336,138 A * 8/1994 Arjawat ............... A63B 23/025 482/136
5,452,728 A 9/1995 Iams
5,498,218 A 3/1996 Proctor et al.
(Continued)

FOREIGN PATENT DOCUMENTS

KR 1020150136439 12/2015
WO 9614810 5/1996

*Primary Examiner* — Adam Baker
(74) *Attorney, Agent, or Firm* — Ballard Spahr LLP

(57) ABSTRACT

A neck therapy device supports the head of a patient in a supine, side-lying or prone position to eliminate the effects of gravity on the cervical vertebrae and associated musculature. A sliding platform supporting the head permits frictionless turning throughout full cervical motion and a cervical support can target a particular cervical vertebra to isolate motion to superior vertebrae. The cervical support is also used to apply traction and pressure to cervical muscles and vertebrae to effect soft-tissue mobilization and activate and strengthen cervical muscles.

7 Claims, 10 Drawing Sheets

(56) References Cited

U.S. PATENT DOCUMENTS 5,569,166 A * 10/1996 Stone ........................ A61N 1/26 601/39
5,772,614 A 6/1998 Lindquist
5,873,846 A 2/1999 Meilus
5,993,357 A 11/1999 Tom et al.
6,007,568 A * 12/1999 Harrell ................. A61H 1/0222 601/24
6,042,523 A 3/2000 Graham
6,217,538 B1 4/2001 Anderson
6,390,997 B1 5/2002 Vitko
6,599,257 B2 7/2003 Al-Obaidi et al.
6,926,650 B2 8/2005 Endelman et al.
7,125,415 B1 10/2006 Hudgens
7,163,500 B2 1/2007 Endelman
7,419,459 B2 9/2008 Van Straaten
7,682,297 B2 3/2010 Graham
8,394,005 B2 3/2013 Solow et al.
8,840,528 B2 * 9/2014 Zylstra ............... A63B 21/4025 482/121
9,079,071 B2 7/2015 Allain et al.
9,999,803 B1 6/2018 Henschel
10,307,284 B2 6/2019 Sudell
11,547,902 B2 * 1/2023 Dickenson ........... A63B 21/055
2003/0216230 A1 11/2003 Wang
2006/0019806 A1 1/2006 Mikulski
2006/0128539 A1 6/2006 Marquez
2010/0144492 A1 * 6/2010 Ruan .................. A63B 21/4003 482/10
2012/0277079 A1 11/2012 Allain et al.
2012/0295771 A1 11/2012 LaGree
2013/0217551 A1 8/2013 Parnell
2014/0011645 A1 1/2014 Johnson et al.
2014/0011647 A1 1/2014 Lalaoua
2014/0088466 A1 3/2014 Hansen
2014/0249461 A1 9/2014 Bissell et al.
2014/0274605 A1 9/2014 McCanney et al.
2015/0202111 A1 7/2015 Byrd
2016/0193098 A1 * 7/2016 Nichols ................ A61G 13/121 602/32
2017/0087397 A1 3/2017 Lagree
2018/0169464 A1 6/2018 Janowski
2018/0353806 A1 * 12/2018 Brask ................. A63B 21/4003
2019/0083349 A1 * 3/2019 Taves ................... A61H 1/0296
2019/0118023 A1 4/2019 Mahimaidas
2019/0134459 A1 5/2019 Locchead
2019/0254911 A1 * 8/2019 Brask ................... A63B 23/025
2020/0108287 A1 4/2020 Robinson
2020/0376326 A1 12/2020 Lagree et al.
2022/0072378 A1 3/2022 Alpay et al.

* cited by examiner

NECK THERAPY DEVICE AND METHOD

FIELD OF THE INVENTION

This invention relates to devices and methods for treating neck dysfunction.

BACKGROUND

The cervical spine forms the vertebral connection between the torso and the head and comprises 7 segments that function, in part, to position the head desirably in space such that a human can see in a desired direction. Frequently, a human looks left or right without turning their torso, rotating the cervical spine and repositioning the head left or right. In an upright position (sitting/standing/walking) the cervical spine is subject to the compressive effects of gravity and resulting muscular tension. With gravity affecting the joint interfaces of each cervical vertebrae, the movement-deterring forces of friction are increased versus an environment free from the effects of gravity.

Outside of the impacted cervical spine kinematics, gravity also imparts its forces to the free-floating scapula (shoulder blade). With muscles acting as the only connection between the scapula and the torso/spine, it is the muscles of the scapula that must constantly resist the effects of gravity from displacing the scapula toward the ground. In the anatomical structure of a human, the scapula is maintained in its vertical position on the back via muscles that travel from the superior (upper) aspect of the scapula to the cranium, cervical spine, and thoracic spine. These muscles keep the scapula from displacing inferiorly (toward the feet) but also exert a force on the head and neck in the direction of the scapula. The forces between the head/neck and scapula are compressive to the spine in nature and result in limiting head motion. To maximize movement of the head, and reduce compressive cervical forces, the muscles must be slackened. This environment can be achieved with the human positioned perpendicular to gravitational forces (supine, prone, sidelying). In this position, the forces of gravity run perpendicular to the spine and the muscles responsible for positioning the scapula. Thus, compressive forces at the cervical spine are eliminated, and the scapula's position does not rely on active muscles. It is expected to be advantageous to treat patients for neck dysfunction without the motion-limiting effects of gravity.

SUMMARY

The invention concerns a device for treating neck dysfunction in the neck of a patient. In one example embodiment, the device comprises a platform for supporting a head of the patient while the patient is in a supine, prone or side-lying position and a bearing mounted on the platform. The bearing permits motion of the platform along a line of motion. As an example, the bearing comprises a plurality of wheels mounted on the platform. The wheels rotating about respective axes oriented transversely to the line of motion of the platform. In an example, the device further comprises a track. The bearing interfaces with the track. The track constrains the line of motion of the platform to linear motion.

In an example, the device further comprises a cervical support. The cervical support comprises a yoke and a frame. The yoke is engageable with the neck, and the frame suspends the yoke adjacent to the platform. In a particular example, the yoke comprises a first leg and a second leg. The second leg is oriented transversely with respect to the first leg. The first and second legs define a crook for receiving the neck. As an example, the device further comprises a first projection and a second projection. The first projection extends from the first leg and the second projection extends from the second leg. The first and second projections are positioned within the crook defined by the first and second legs.

As an example, the first and second legs define a "V" shaped crook. In an example, the first and second legs define a "U" shaped crook.

In an example, the frame comprises a base and first and second stanchions. The first and second stanchions are mounted on the base and extend transversely thereto. The first and second stanchions are in spaced apart relation. The platform is received between the stanchions. In a particular example, the device further comprises at least one cable attaching the yoke to the first and second stanchions. In another particular example, the device further comprises a link attaching the yoke to the base.

As an example, the first and second stanchions are pivotable about an axis oriented transversely to the base. In an example, the first and second stanchions may be fixed at a desired orientation angle relative to the base to impart stabilization and compression or traction to the patient.

In an example, the frame comprises a base and first and second rails. The first and second rails are mounted on the base and extend in a direction transversely to the platform. The rails are positioned in spaced apart relation above the base. The yoke is suspendable between the rails at a plurality of positions lengthwise therealong.

As an example, the device further comprises a cradle positioned adjacent to the platform for receiving and supporting the neck. In a particular example, the cradle comprises a base and first and second arms. The first and second arms are mounted on the base and projecting transversely thereto. A first end of the first arm is arranged in spaced relation to a second end of the second arm such that the first arm engages the neck on a first side and the second arm engages the neck on a second side thereof opposite to the first side. In another particular example, the first and second arms are angularly adjustable relatively to the base at an orientation angle.

In an example, the first and second arms are angularly adjustable about respective axes to permit motion of the arms about the axes toward and away from one another.

As an example, the cradle comprises a support block supporting the yoke. In a particular example, the yoke is oriented at an adjustable orientation angle with respect to the support block.

In an example, the platform comprises a surface for receiving the head. The surface is angularly adjustable about an axis parallel to the line of motion of the platform. In a particular example, the surface has a concave shape.

As an example, the track comprises a beam.

In an example, the device further comprises first and second projections in spaced apart relation to one another. The projections extend from the platform.

As an example, the device further comprises a frame and a weight attached to said platform. The frame supports the platform and comprises a base. The platform is oriented transverse to the base. The weight is attached to the platform and positioned opposite the head.

In an example, the device further comprises a frame and first and second biasing elements. The biasing elements connect the platform to the frame and provide resistance to motion along the line of motion of the platform.

The invention also concerns a device for treating neck dysfunction in the neck of a patient while the patient is in a supine, prone or side-lying position. As an example, the device comprises a track and a platform. The platform supports a head of the patient. The platform slidably engages the track for motion along a line of motion defined by the track. In a particular example, the device further comprises a bearing positioned between the platform and the track. In another particular example, the bearing comprises a plurality of wheels mounted on the platform. The wheels engage the track and rotate about respective axes oriented transversely to the line of motion of the platform.

As an example, the platform comprises a surface for receiving the head. The surface being angularly adjustable about an axis parallel to the line of motion of the platform. In a particular example, the surface has a concave shape.

In an example, the bearing comprises at least one low friction pad mounted on one of the platform or the track for reducing sliding friction between the platform and the track. In a particular example, the device further comprises first and second skirts mounted on opposite sides of the platform and extending transversely to the surface. The skirts overlap and engage the track to constrain motion of the platform therealong to linear motion. In another particular example, the device further comprising first and second skirts mounted on opposite sides of the track and extending transversely to the surface. The skirts overlap and engage the platform to constrain motion of the platform along the track to linear motion. In an example the track comprises a beam.

In an example, the device further comprises a cradle positionable adjacent to the platform for receiving and supporting the neck. As an example, the cradle comprises a base, and first and second arms. The first and second arms are mounted on the base and project transversely thereto. A first end of the first arm is arranged in spaced relation to a second end of the second arm such that the first arm engages the neck on a first side and the second arm engages the neck on a second side thereof opposite to the first side. In a particular example, an orientation angle of the first and second arm relative to the base is adjustable. In another particular example, the first and second arms are angularly adjustable about respective axes to permit motion of the arms about the axes toward and away from one another.

In an example, the cradle comprises a support block to support the yoke. In a particular example, the yoke is angularly adjustable with respect to the support block.

The invention also concerns a cervical support for treating neck dysfunction in a neck of a patient while the patient is in a supine, prone or side-lying position. As an example, the cervical support comprises a yoke engageable with the neck, and a frame suspending the yoke. In a particular example, the yoke comprises a first leg and a second leg. The second leg is oriented transversely with respect to the first leg. The first and second legs define a crook for receiving the neck.

In an example, the cervical support further comprises a first projection and a second projection. The first projection extends from the first leg. The second projection extends from the second leg. The first and second projections are positioned within the crook defined by the first and second legs. As an example, the first and second legs define a "V" shaped crook. In an example, the first and second legs define a "U" shaped crook.

As an example, the frame comprises a base and first and second stanchions. The first and second stanchions are mounted on the base and extend transversely thereto. The first and second stanchions are in spaced apart relation. In a particular example, the cervical support further comprises at least one cable attaching the yoke to the first and second stanchions. In another particular example, the cervical support further comprises a link attaching the yoke to the base.

In an example, the first and second stanchions are pivotable about an axis oriented transversely to the base. In a particular example, the first and second stanchions may be fixed at a desired orientation angle relative to the base to impart stabilization and compression or traction to the patient.

As an example, the frame comprises a base and first and second rails. The first and second rails mount on the base and extend in a direction transversely to the platform. The rails are positioned in spaced apart relation above the base. The yoke is suspendable between the rails at a plurality of positions lengthwise therealong.

The invention further concerns a cervical support for treating neck dysfunction in a neck of a patient while the patient is in a supine, prone or side-lying position. As an example, the cervical support comprises a resistance band engageable with the neck, and a frame suspending the resistance band. In a particular example, the resistance band comprises flexible elastic or inelastic material.

As an example, the frame comprises a base and first and second stanchions. The first and second stanchions are mounted on the base and extend transversely thereto. The first and second stanchions are in spaced apart relation. The resistance band is attached to and extends between the first and second stanchions. In a particular example, the first and second stanchions are pivotable about an axis oriented transversely to the base. As an example, the first and second stanchions may be fixed at a desired orientation angle relative to the base to impart stabilization and compression or traction to the patient.

In an example, the frame comprises a base and first and second rails mounted on the base. The rails are positioned in spaced apart relation above the base. The resistance band is suspended between the rails at a plurality of positions lengthwise therealong.

As an example, the cervical support further comprises a platform and a bearing mounted on the platform. The platform is for supporting a head of the patient while the patient is in a supine, prone or side-lying position. The bearing permits motion of the platform along a line of motion. In a particular example, the bearing comprises a plurality of wheels mounted on the platform. The wheels rotate about respective axes oriented transversely to the line of motion of the platform. As an example, the cervical support further comprises a track. The bearing interfaces with the track, and the track constrains the line of motion of the platform to linear motion.

In an example, the cervical support further comprises a track and a platform for supporting a head of the patient. The platform slidably engages the track for motion along a line of motion defined by the track. In a particular example, the platform comprises a surface for receiving the head. The surface is angularly adjustable about an axis parallel to the line of motion of the platform. As an example, the surface has a concave shape.

This invention also concerns a method of treating a patient for neck dysfunction. In an example, the method comprises:

with the patient in one of a supine, prone, or side-lying position, supporting the patient's head on a platform movable in a direction transverse to the neck;

while supported on the platform, moving the head of the patient.

In an example, moving the head comprises at least one of rotating the head, flexing the head, extending the head, and side bending the head.

As an example, the method further comprises activating cervical muscles by supporting a posterior of the neck. In a particular example, the method further comprises supporting a posterior of the neck at one or more cervical vertebrae of the patient. In another particular example, the method further comprises applying pressure to the cervical muscles in a direction posterior to anterior or anterior to posterior.

In an example, the method further comprises applying a traction to the cervical region. In a particular example, the method further comprises applying the traction via pressure on a single or multiple vertebrae or head.

As an example, the method further comprises applying manual therapy to the patient. In a particular example, the manual therapy is selected from the group consisting of joint mobilization, joint manipulation, soft tissue mobilization, massage, manual resistance to patient motion, stretching, proprioceptive position training, proprioceptive joint training, active assisted range of motion, passive range of motion and combinations thereof. In another particular example, the joint mobilization is performed on a joint selected from the group consisting of cervical facet joints, rib joints, cervical-thoracic facet joints, occipital cervical joints and combinations thereof. In another example, the soft tissue mobilization is performed on a muscle selected from the group consisting of suboccipital muscles, scapular muscles, paraspinal muscles, scalene muscles, sternocranial muscles and combinations thereof.

As an example, the method further comprises a therapist applying the manual therapy. In an example, the method further comprises the patient applying the manual therapy.

The invention also concerns a method of treating a patient for neck dysfunction. As an example, the method comprises:

with the patient in one of a supine, prone, or side-lying position, supporting the patient's head on a cervical support;

while supported on the cervical support, moving the head of the patient.

In an example, moving the head comprises at least one of rotating the head, flexing the head, extending the head, and side bending the head. In a particular example, the method further comprises connecting the platform to a frame via first and second biasing elements, and with the biasing elements providing resistance to motion in the direction transverse to the neck, rotating the neck.

As an example, the method further comprises activating cervical muscles by supporting a posterior of the neck. In a particular example, the method further comprises supporting a posterior of the neck at one or more cervical vertebrae of the patient. In another particular example, the method further comprises applying pressure to the cervical muscles in a direction posterior to anterior or anterior to posterior. In an example, the method further comprises applying the traction to the cervical region.

In an example, the method further comprises applying manual therapy to the patient. In a particular example, the manual therapy is selected from the group consisting of joint mobilization, joint manipulation, soft tissue mobilization, massage, manual resistance to patient motion, stretching, proprioceptive position training, proprioceptive joint training, active assisted range of motion, passive range of motion and combinations thereof. In another particular example, the joint mobilization is performed on a joint selected from the group consisting of cervical facet joints, rib joints, cervical-thoracic facet joints, occipital cervical joints and combinations thereof. As an example, the soft tissue mobilization is performed on a muscle selected from the group consisting of sub-occipital muscles, scapular muscles, paraspinal muscles, scalene muscles, sternocranial muscles and combinations thereof.

As an example, the method further comprises a therapist applying the manual therapy. In an example, the method further comprises the patient applying the manual therapy.

DETAILED DESCRIPTION

Figure 1:
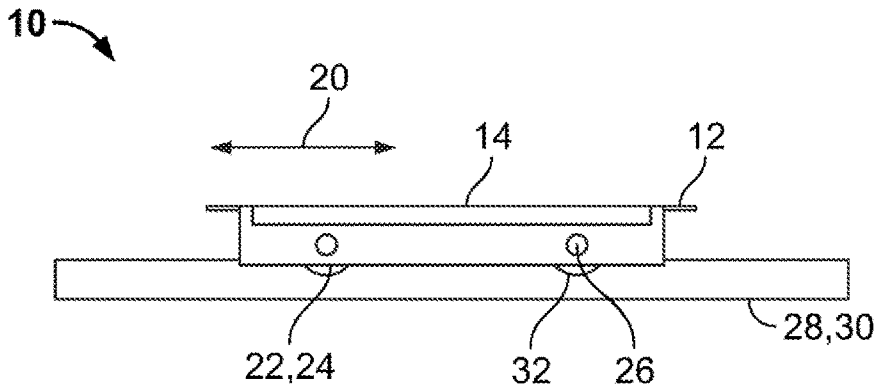
FIG. 1 is a side view of an example neck therapy device according to the invention.
Figure 2:
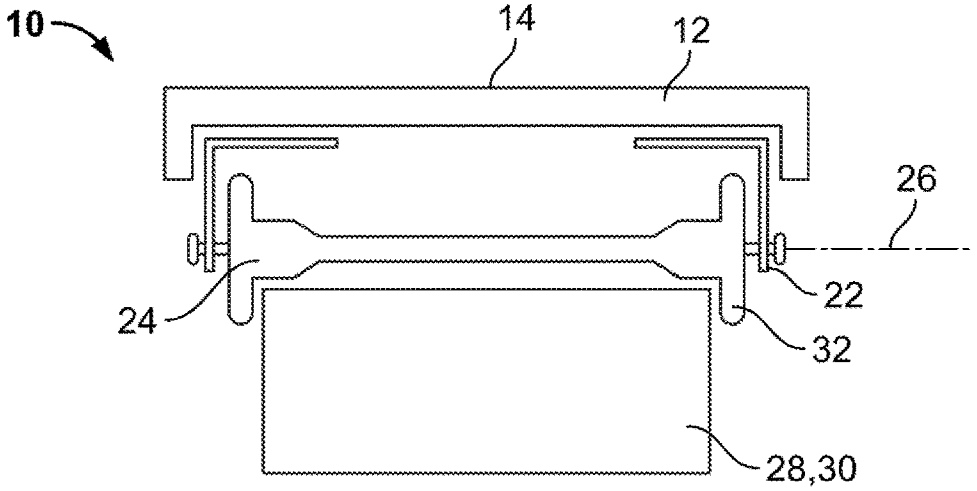
FIG. 2 is an end view of the neck therapy device shown in FIG. 1.
Figure 3:
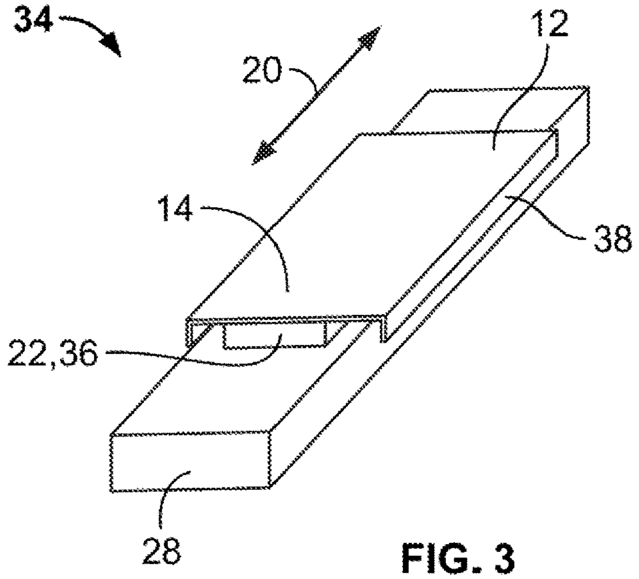
FIG. 3 is an isometric view of another example embodiment of a neck therapy device according to the invention.
Figure 7:
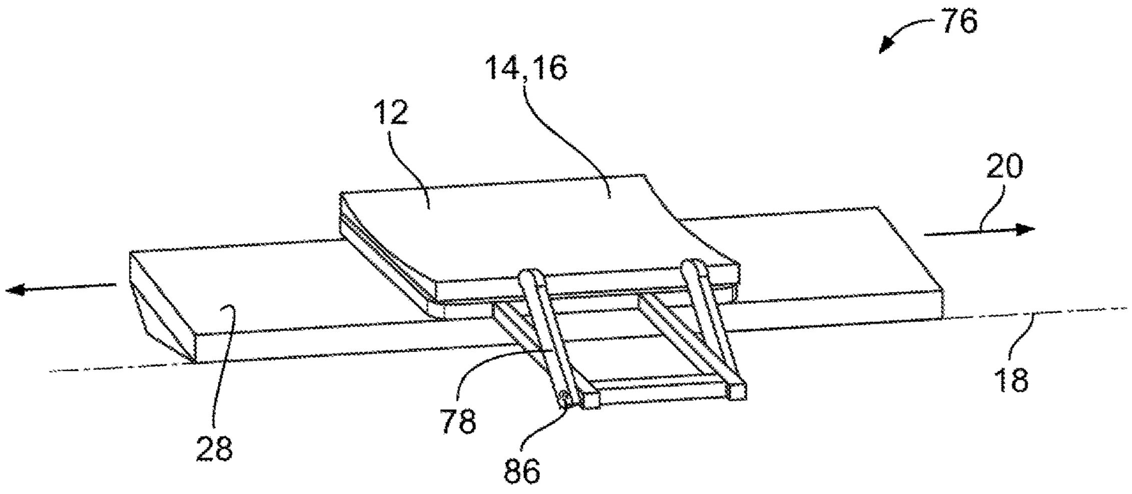
FIG. 7 is an isometric view of an example embodiment of a neck therapy device according to the invention.

FIG. 1 shows an example embodiment of a device 10 for treating neck dysfunction in a patient. Neck dysfunction includes neck pain, neck stiffness, neck pain related headaches and neck muscle soreness. Device 10 comprises a platform 12 for supporting the head of a supine patient. Platform 12 has a surface 14 which receives the patient's head. As shown in FIG. 7, surface 14 may have a concave shape 16, and the surface 14 may also be angularly oriented and angularly adjustable about an axis 18 parallel to a line of motion 20 of platform 12 as described below. As shown in FIGS. 1 and 2, device 10 comprises a bearing 22 mounted on platform 12. In this example embodiment the bearing comprises a plurality of wheels 24 mounted for rotation about axes 26 oriented transversely to and thus, in this example, defining the line of motion 20 of the platform 12. Wheels 24 may engage the ground, a table top or other surface. In another embodiment the device 10 may further comprise a track 28 which the wheels engage. In the example embodiment shown track 28 comprises a monorail in the form of a beam 30 which is engaged by wheels 24, the wheels having flanges 32 which maintain the platform 12 on the track, interaction between the flanged wheels and the track constraining the motion of device 10 to linear motion. FIG. 3 shows another device embodiment 34, wherein the bearing 22 comprises at least one low friction pad 36 positioned between the platform 12 and the track 28. Pad 36 could be formed of low friction material such as polytetrafluoroethylene, and may be mounted on either the track 28 or the platform 12. Skirts 38, mounted on opposite sides of the platform 12, extend transversely to the surface 14, the skirts overlapping the track 28 and constraining the line of motion 20 of the platform 12 to linear motion along the track. In an alternate embodiment, skirts 38 could also be attached to the track 28. In both example embodiments 10 and 34, the monorail track comprises a simple beam, it being understood that other types of beams (I-beams for example), as well as other types of tracks (multi-rail tracks), are also feasible.

Devices 10 and 34 may further include a cervical support (FIGS. 4-9, 11 and 12). The purpose of the cervical support is to apply force to the posterior (back) of the cervical spine at a single vertebral level. This force is in the direction from posterior to anterior (back to front). In order to counteract the posterior to anterior force of the cervical support, cervical muscles must activate so that the neck does not extend. The benefits of using the cervical support (in conjunction with the sliding platform 12) are three-fold:

1. The cervical support activates the deep cervical stabilizing muscles to counteract the destabilizing forces of the cervical support. Activation of the stabilizing muscles is expected to help rehabilitate a patient with neck dysfunction because, with these muscles activated, the patient is then free to rotate their head left and right, requiring additional dynamic stability of the appropriate musculature.
2. The cervical support applies a force that restricts rotational motion of a single or multiple vertebrae. By positioning the cervical support on the posterior aspect of a specific cervical vertebrae, cervical rotation at the selected level and all levels below will be decreased. This targets motion at specific cervical levels. Placement of the cervical support on cervical vertebrae 3 (C3), will result in maximizing rotation of C2 on C3, and C1 on C2 for example. Thus, areas restricted in mobility can be targeted and treated.
3. The cervical support can be used for soft-tissue mobilization (STM) where pressure is applied to muscles with myofascial pain or mobility restrictions. Applying targeted pressure to symptomatic muscles is known to benefit symptoms and muscle tenderness. It is advantageous to use the cervical support in conjunction with the sliding platform to allow STM of irritated muscles while rotating the neck left and right.

Figure 4:
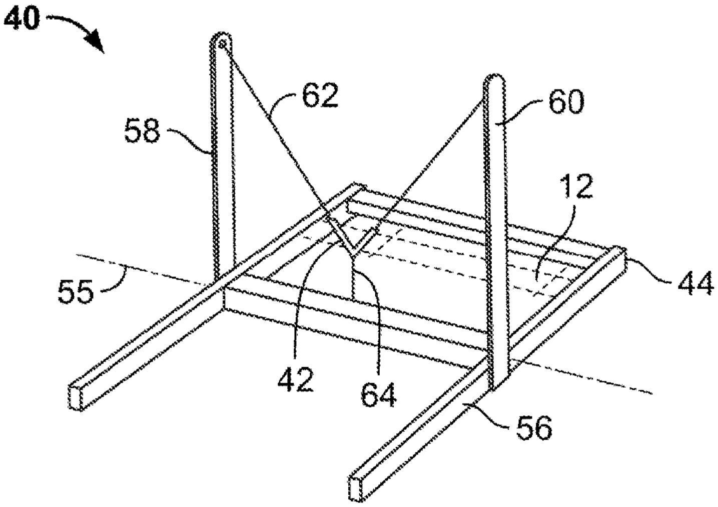
FIG. 4 is an isometric view of another example embodiment of a neck therapy device according to the invention.
Figure 5:
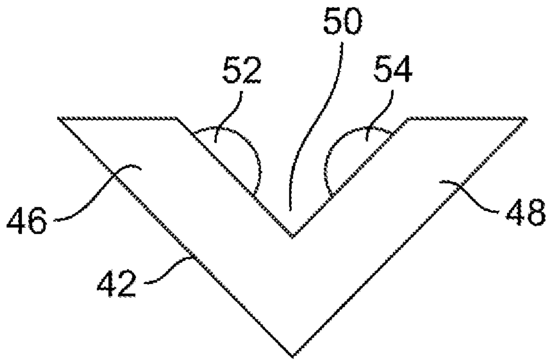
FIG. 5 is a front view of a component of the neck therapy device shown in FIG. 4.
Figure 5A:
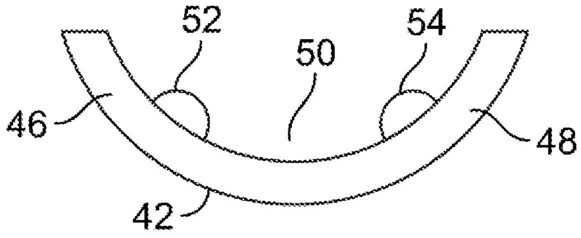
FIG. 5A is a front view of an alternate embodiment of a component of the neck therapy device shown in FIG. 4.

As shown in FIG. 4, an example cervical support 40 comprises a yoke 42 adapted to engage the neck of the patient, and a frame 44 for suspending the yoke adjacent to the platform 12. As shown in FIG. 5, an example yoke 42 may comprise a first leg 46 and a second leg 48 oriented transversely to the first leg. Together the first and second legs form a crook 50 for receiving the neck of a patient. In this example the crook 50 has a V-shape. First and second projections 52 and 54 may extend respectively from the first and second legs 46 and 48 such that the projections are positioned within the crook 50. Projections 52 and 54 are used to apply pressure to neck muscles according to soft-tissue mobilization techniques, known to benefit myofascial pain, mobility symptoms and muscle tenderness. As shown in FIG. 5A, yoke 42 may have other shapes, such as a U-shape having curved legs 46 and 48 which form the crook 50. The curved legs 46 and 48 may also support projections 52 and 54.

Figure 4A:
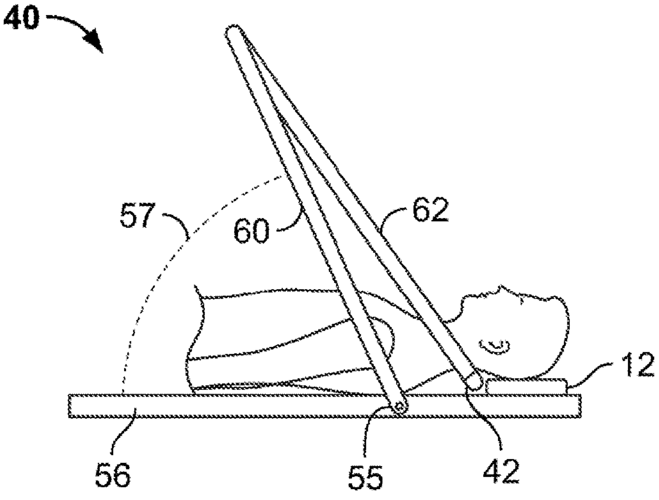
FIGS. 4A and 4B are side views showing the embodiment of FIG. 4 in use.
Figure 4B:
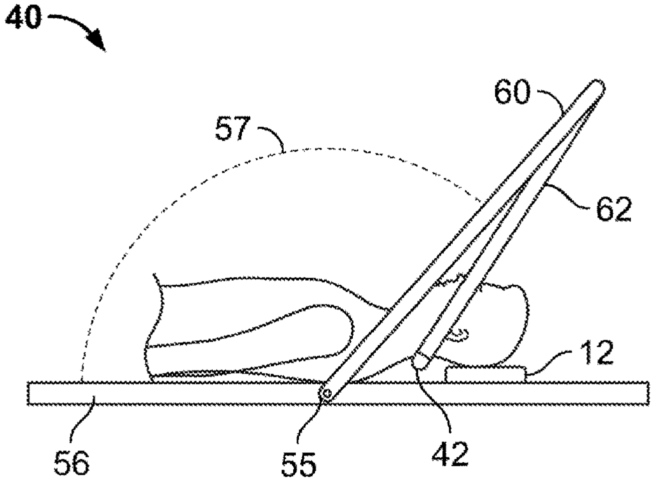
Figure 4C:
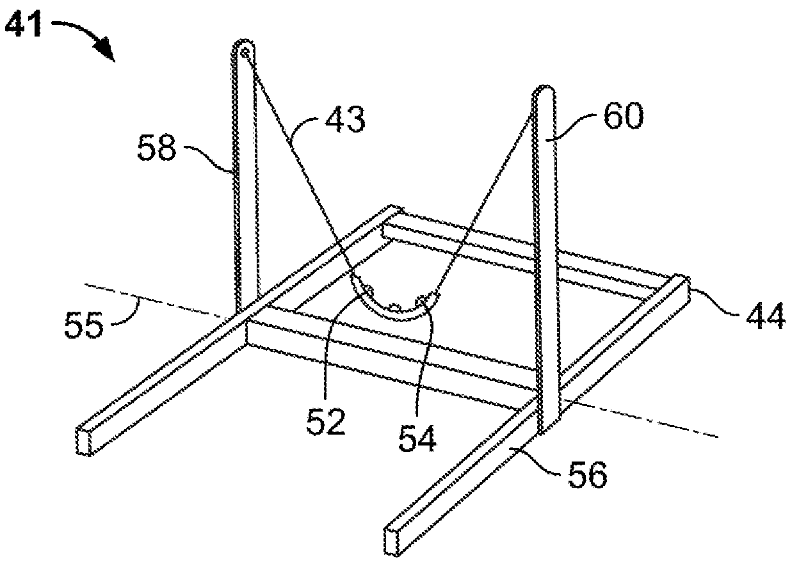
FIG. 4C is an isometric view of an alternate embodiment of a neck therapy device according to the invention.

As shown in FIG. 4, frame 44 comprises a base 56 on which first and second stanchions 58 and 60 are mounted. Stanchions 58 and 60 extend transversely to the base 56 and are positioned in spaced apart relation to permit platform 12 to be received between them. One or more cables 62 may be used to attach the yoke 42 to the stanchions 58 and 60, and a link 64 may be used to attach the yoke to the base 56 and stabilize the yoke. As shown in FIGS. 4A and 4B, stanchions 58 and 60 (60 being visible) are pivotable about an axis 55 oriented transversely to base 56 (see also FIG. 4). Stanchions 58 and 60 may be fixed at a desired orientation angle 57 relative to the base 56 to impart stabilization and compression (FIG. 4A) or a traction (FIG. 4B) to the patient. Stanchions 58 and 60 may be angularly fixed via known devices such as ball and spring detents, as well as via friction between the stanchions and the base imparted through compression fasteners such as bolts and wingnuts (not shown). Stanchions 58 and 60 may also be adjustable in length, for example using telescoping segments with spring biased ball detents. In an alternate cervical support 41 shown in FIG. 4C, the frame 44 is used to support a resistance band 43. The resistance band 43 is formed of a flexible elastic or inelastic material and is used without the yoke to provide cervical support, to impart stabilization, compression and traction to a patient as described above. Resistance band 43 may comprise materials such as rubber compounds, and fabrics made of natural fibers such as cotton, as well as synthetics such as polyester, neoprene, nylon and other polymers, either alone or blended.

Figure 6:
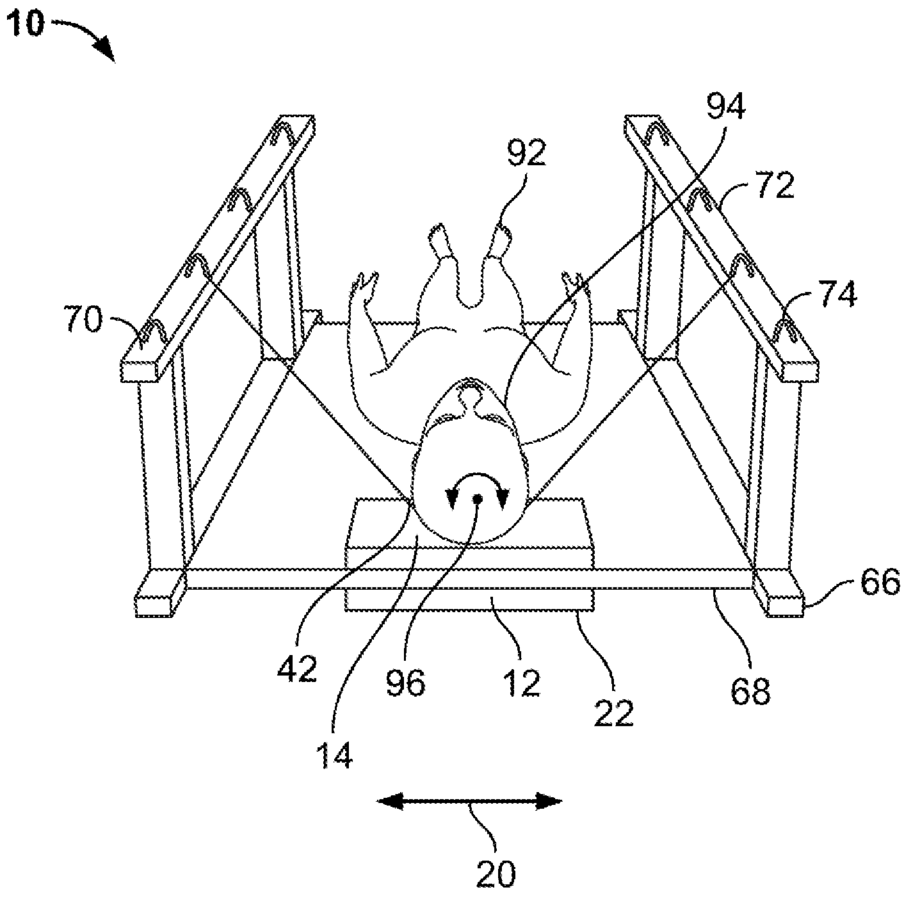
FIG. 6 is an isometric view of an example embodiment of a neck therapy device according to the invention in use by a patient.
Figure 6A:
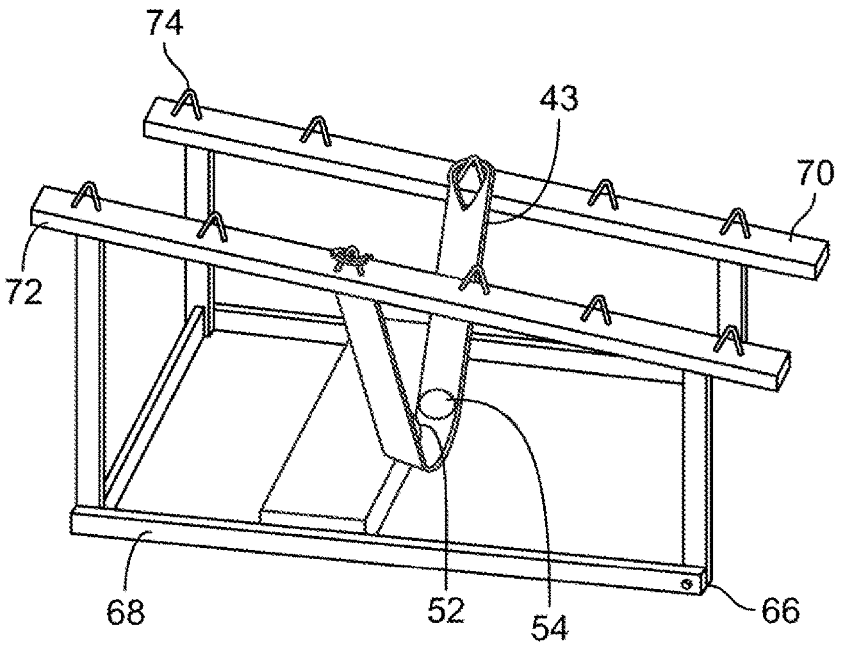
FIG. 6A is an isometric view of an alternate embodiment of a neck therapy device according to the invention.

FIG. 6 shows another example frame 66. Frame 66 comprises a base 68 and first and second rails 70 and 72 positioned above and extending in a direction transversely to the line of motion 20 of the platform 12. Yoke 42 may be suspended between rails 70 and 72 at any of a plurality of positions along the rails. Detents 74, in the form of projections extending from rails 70 and 72, fix the position of the yoke 42 along the rails and compensate for differently sized patients as well as allow a traction to be exerted on the cervical vertebrae. As shown in FIG. 6A, frame 66 may also be used to support a resistance band 43. Resistance band 43 may be suspended between the rails 70 and 72 at any of the plurality of positions lengthwise along the rails marked by the detents 74 to provide stabilization, compression or traction to the patient as desired.

Figure 8A:
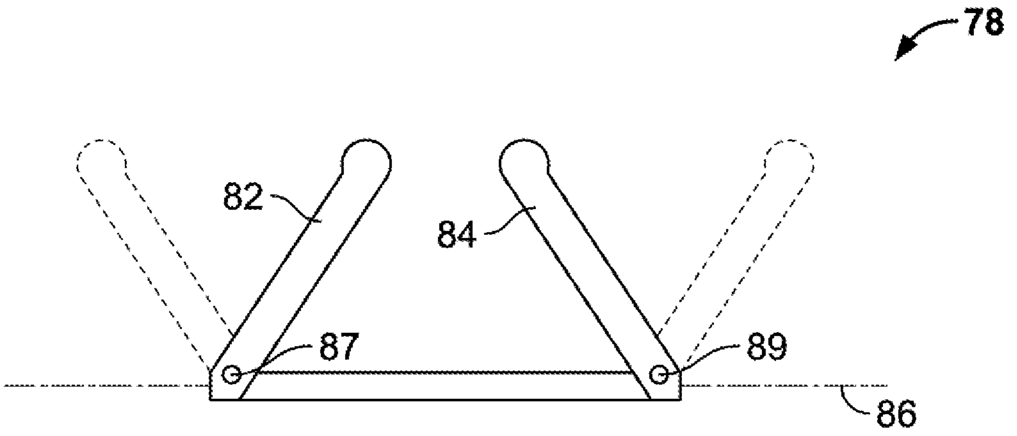
FIG. 8A is a front view of an alternate embodiment of a component of the neck therapy device shown in FIG. 7.
Figure 8:
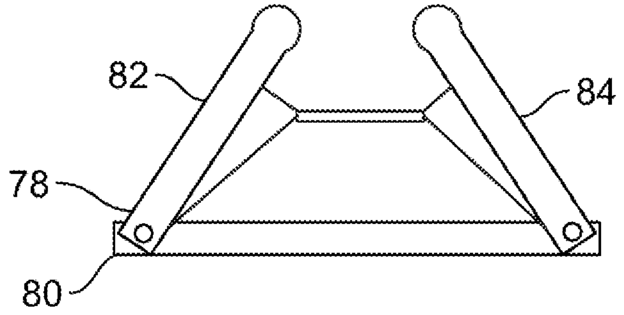
FIG. 8 is a front view of a component of the neck therapy device shown in FIG. 7.
Figure 9:
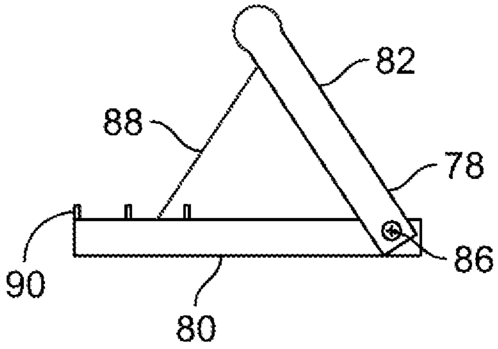
FIG. 9 is a side view of a component of the neck therapy device shown in FIG. 7.

FIGS. 7-9 show another example embodiment of a device 76 according to the invention. Platform 12 is positionable such that surface 14 is angularly oriented and angularly adjustable about axis 18, parallel to the platform line of motion 20. In this example the angular orientation of surface 14 is achieved by angularly orienting the track 28, although it is understood that the platform 12 could also be angularly oriented with respect to the track to achieve the desired orientation of surface 14. Further in this example, the cervical support comprises a cradle 78 positioned adjacent to the platform 12. As shown in FIGS. 8 and 9, cradle 78 comprises a base 80 on which first and second arms 82 and 84 are mounted. The arms 82 and 84 project from the base 80 and are arranged in spaced relation such that the first arm 82 engages the patient's neck on a first side and the second arm 84 engages the neck on a second side thereof, opposite to the first side. As shown in FIGS. 7 and 9, the arms 82 and 84 may be angularly adjustable with respect to the base, the arms being attached to the base via respective hinges 86 and having a backstay 88 engageable with one of a plurality of detents 90 in the base 80. As shown in FIG. 8A, arms 82 and 84 of cradle 78 may be further angularly adjustable about respective axes 87 and 89, oriented transversely to axis 86. Rotation about axes 87 and 89 allows the arms to be moved toward (shown in solid line) and away (shown in broken line) from one another. The angular orientation of the arms 82 and 84 may be fixed using spring and ball detents or fasteners to impart friction as is well understood. Arms 82 and 84 may also be adjustable in length, for example, using telescoping segments with spring biased ball detents.

Figure 10:
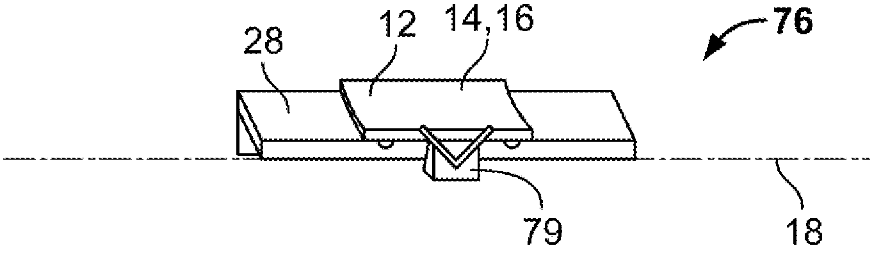
FIG. 10 is an isometric view of an alternate embodiment of an example neck therapy device according to the invention.
Figure 11:
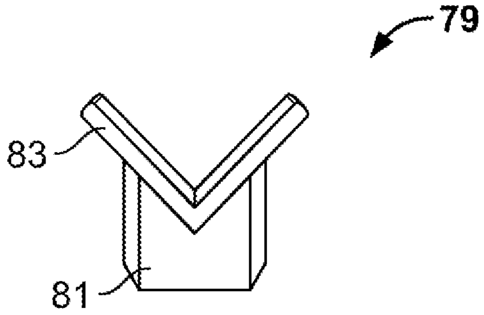
FIG. 11 is an isometric view of a component of the neck therapy device shown in FIG. 10.
Figure 12:
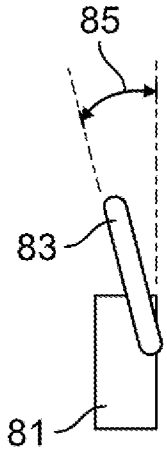
FIG. 12 is a side view of the component shown in FIG. 11.

FIGS. 10-12 show another example embodiment of device 76 having a cervical support cradle 79 comprising a support block 81 supporting a yoke 83. Similar to yoke 42, yoke 83 has a "V" shape but could also have other shapes such as a "U" shape. Cervical support cradle is positioned adjacent to the platform 12 as shown in FIG. 10, and, as shown in FIG. 12, the yoke 83 may have an orientation angle 85 with respect to the support block 81.

Figure 6B:
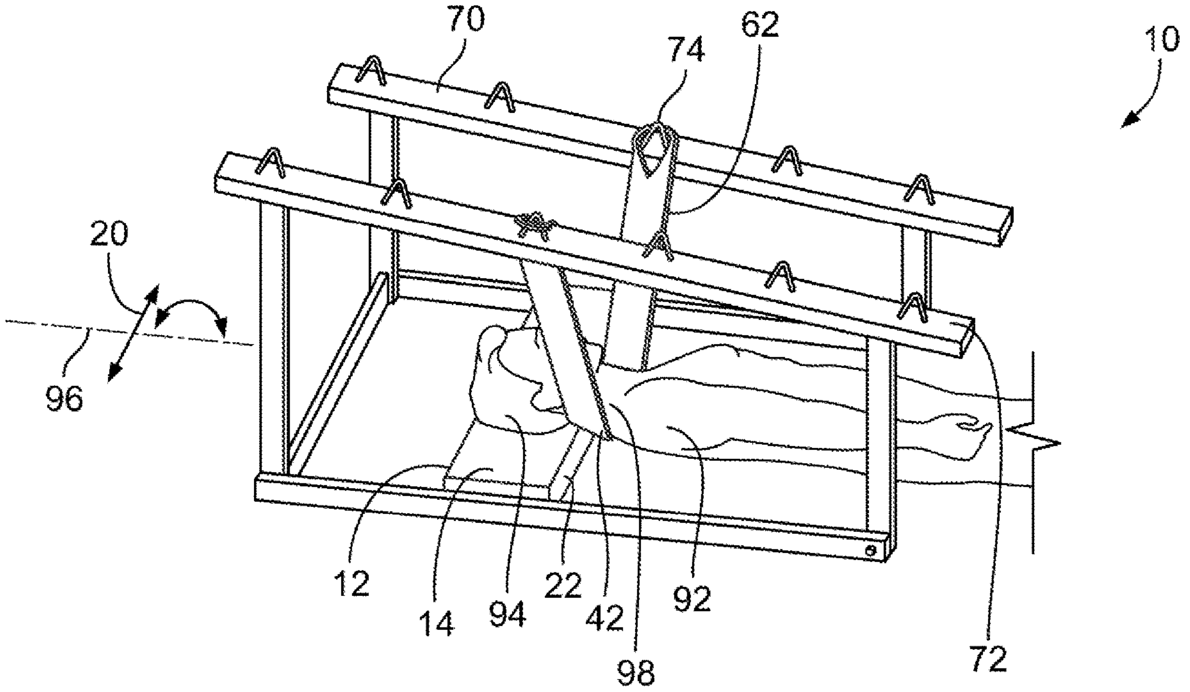
FIG. 6B is an isometric view of the neck therapy device shown in FIG. 6 in use by a patient.

FIGS. 6 and 6B shows an example device 10 in use. According to an example method of treatment, with the patient 92 in a supine position, the patient's head 94 is supported on surface 14 of platform 12. The patient's head is rotated about an axis 96 along the intersection of the coronal and median planes to effect the therapy, the platform 12 sliding along its line of motion 20 in response. The motion of the platform 12 is substantially friction-free via the bearing 22. As the platform 12 is freely moving during head rotation, the user's head may remain neutrally located without additional unsolicited movements during pure head rotation. This pure head rotation allows the user to turn their head naturally, just as they would when sitting or standing with their head unsupported freely in space. During head rotation it is further advantageous to support the neck 98 of the patient 92 at a single or multiple cervical vertebra using the yoke 42 or the cable 62 alone, or the resistance band 43 shown in FIGS. 4C and 6A. Pressure may be applied to selected cervical muscles using the projections 52 and 54 extending from yoke 42 (see FIGS. 5 and 5A), by the projections attached to the cable 62 or the resistance band 43 (see FIGS. 4C and 6A), or by the projections attached to the platform (see FIG. 6E). Traction as well as compression may also be applied to the neck by arranging the cable 62 or the resistance band 43 at an appropriate detent 74 along the rails 70 and 72 as shown in FIGS. 6 and 6A.

Figure 6C:
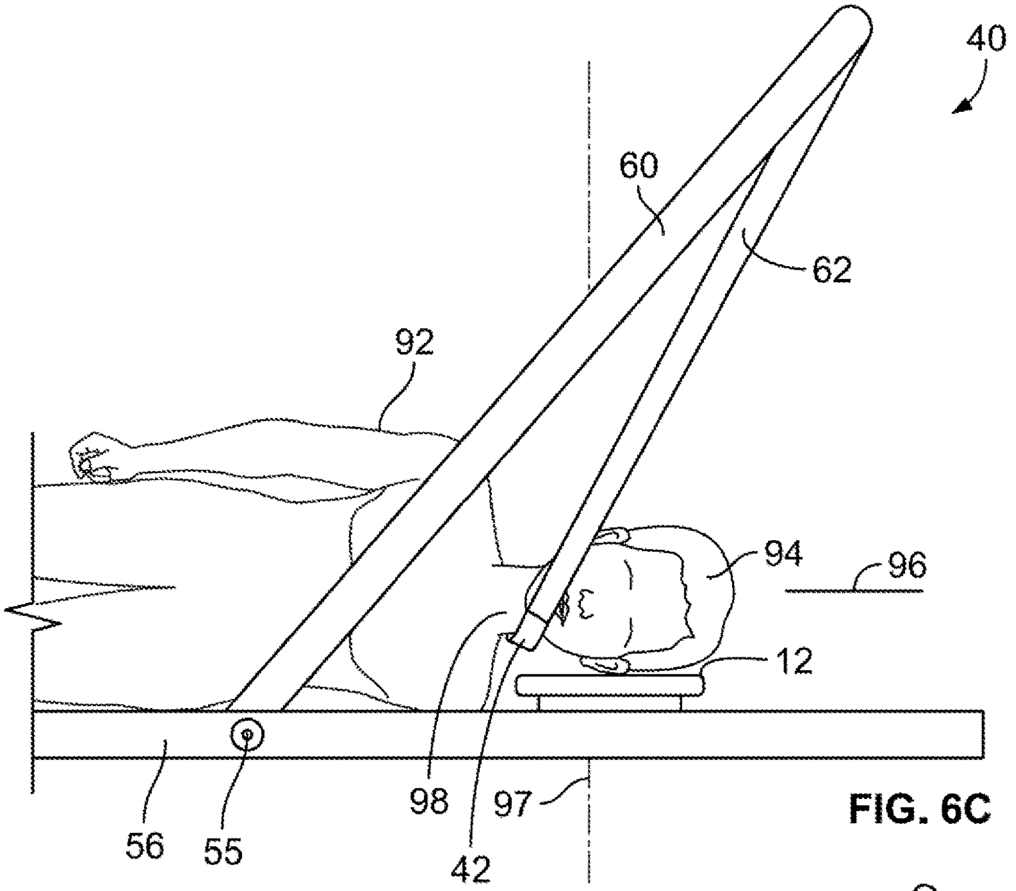
FIGS. 6C and 6D are side views of the neck therapy device shown in FIG. 4 in use by a patient.
Figure 6D:
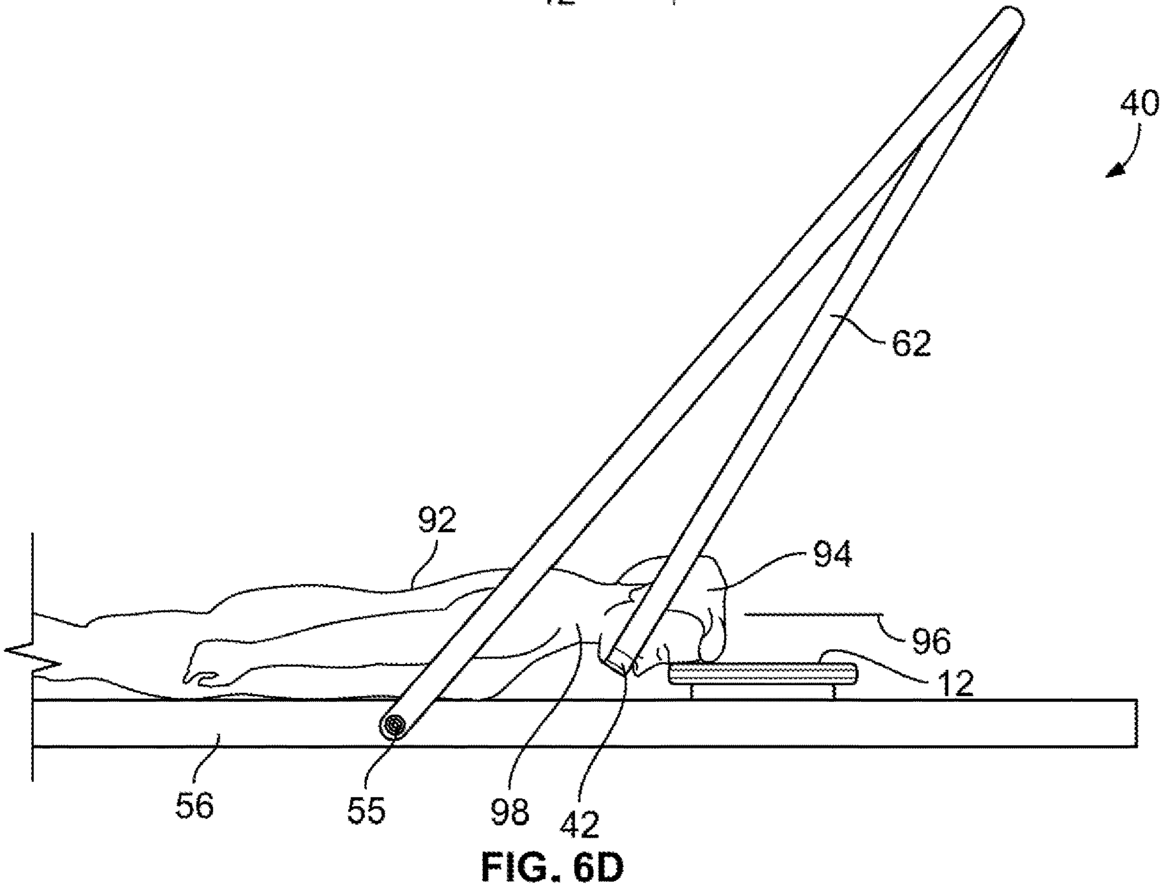
Figure 6E:
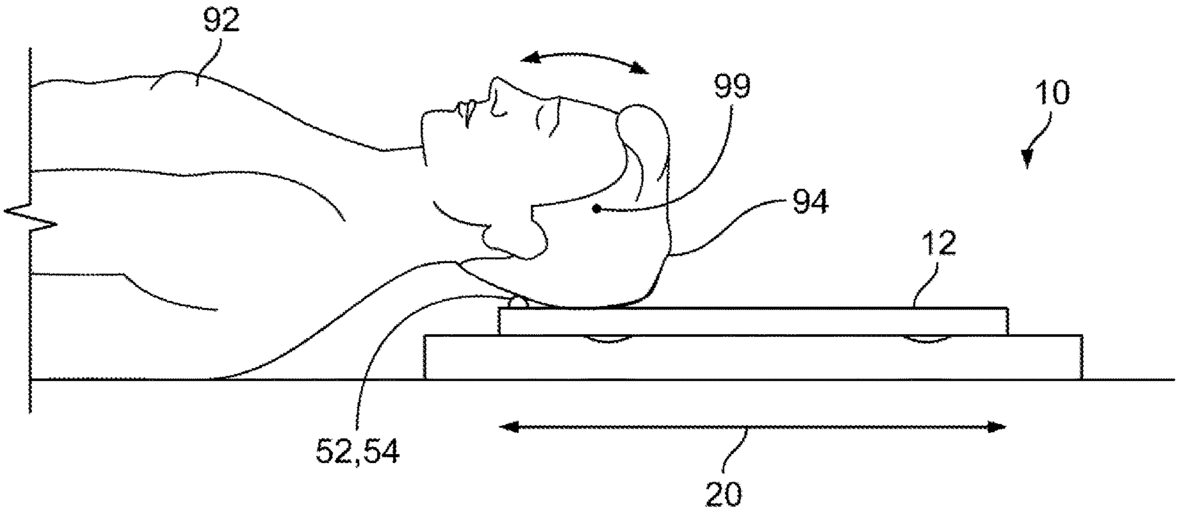
FIG. 6E is a side view of the neck therapy device shown in FIG. 1 in use by a patient.

FIGS. 6C and 6D illustrate use of device 40 to treat neck dysfunction with the patient 92 in a "side-lying" position (FIG. 6C) and in a prone position (FIG. 6D). Although shown using the cable 62 supporting yoke 42, it is understood that the cable alone or the resistance band 43 could also be used in the side-lying and prone positions. In both cases the stanchions 58 and 60 (60 shown) are angularly oriented and angularly adjustable to apply a traction to the neck 98. With the patient's head 94 resting on the platform 12 the head is rotated about axis 96. Another treatment with the patient 92 in the side-lying position of FIG. 6C has the patient rotating the head 94 in flexion and extension about axis 97 substantially perpendicular to axis 96. Treatment requiring head flexion and extension while supine or prone is illustrated in FIG. 6E about an axis 99 parallel to the coronal plane of the patient 92. In this treatment the device 10 is aligned with the patient's spine so that the direction of motion 20 of platform 12 moves tangentially to the head 94 as it rotates about axis 99.

Figure 13:
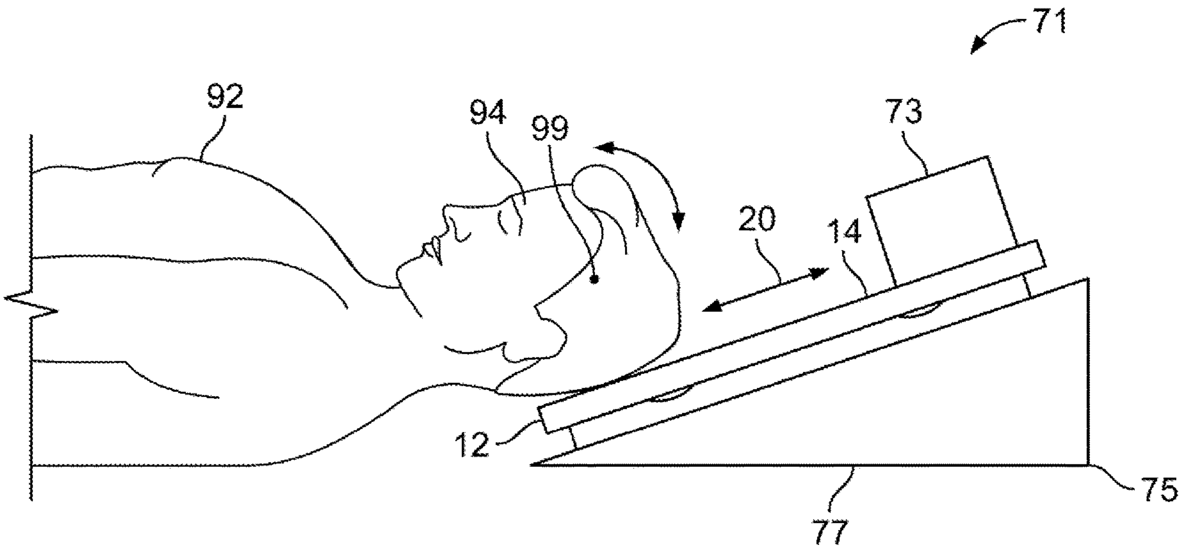
FIG. 13 is a side view of an alternative embodiment of an example neck therapy device according to the invention.

FIG. 13 illustrates use of a device 71 to treat neck dysfunction with the patient 92 in a supine position. While supine, the patient's head is resting on the surface 14 of platform 12. A frame 75, comprising a base 77, supports the platform 12. The platform 12 is oriented transverse the base 77. Treatment using the device 71 requires head flexion and extension, about an axis 99 parallel to the coronal plane of the patient 92. The direction of motion 20 of platform 12 moves tangential to the head 94 as it rotates about axis 99. The resistance to the motion 20 of platform 12 is provided by the force of weight 73 mounted opposite the patient's head 94 on the platform 12. As an example, the weight 73 may be five pounds, and may be increased or decreased based on the therapeutic needs of the patient.

Figure 14:
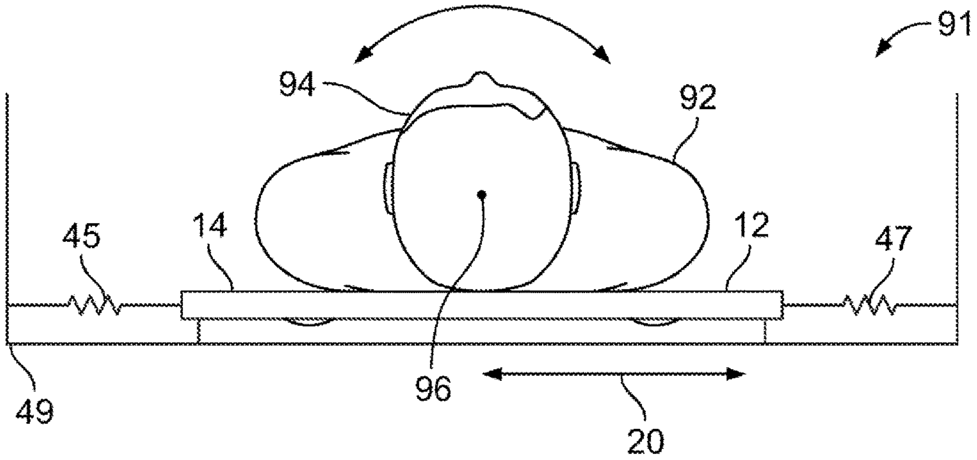
FIG. 14 is a front view of an alternative embodiment of an example neck therapy device according to the invention.

A device 91 is used to treat neck dysfunction with the patient 92 in a supine position, the patient's head 94 is supported on the surface 14 of platform 12, as shown in FIG. 14. The patient's head is rotated about an axis 96 along the intersection of the coronal and median planes to effect the therapy, the platform 12 sliding along its line of motion 20 in response. First and second biasing elements 45 and 47 connect the platform 12 to frame 49. The motion of the platform 12 is resisted by first and second biasing elements 45 and 47.

Use of the neck therapy devices and methods disclosed herein is expected to effectively treat neck dysfunction. Neck dysfunction presents in different neck locations and for different reasons, dependent on a particular patient. Below are example sources of neck dysfunction, and explanations of how neck therapy devices according to the invention can be used to treat the neck dysfunction at its source.

Example 1

Neck pain with stiffness: This condition afflicts patients who have difficulty turning or moving their head due to pain or stiffness. Pain is commonly present at end-range neck positions, such as maximum neck rotation. The device according to the invention is expected to allow the patient to repetitively move, such as rotate, their head as far as their physiology allows without the compressive and symptom-producing effects of gravity. Range of motion improvements are expected to be achieved with repetition of head movements, such as rotation, stretching and lengthening any restricting structures.

Example 2

Neck pain with headaches: This condition commonly afflicts patients with poor posture, high stress levels, and/or prolonged sitting habits. Pain is felt at the very top of the neck and base of the skull. Headaches may radiate around the sides of head toward the eyes. Devices and methods according to the invention will allow the patient to activate, stretch, and relax the suboccipital muscle group responsible for the symptoms. The suboccipital muscles commonly become tightened and aggravated in positions of poor posture. Use of the devices and methods according to the invention allow for reversal of this position, and reciprocal activation followed by stretching of the muscle group with each head turn. Contraction followed by relaxation of symptomatic muscles results in muscular relaxation and reduced symptoms.

Example 3

Neck pain with hypermobility: This describes the patient who has too much mobility at their cervical spine, resulting in neck symptoms. Devices and methods according to the invention will allow the user to activate the muscles necessary for stabilization and muscular motion restraint while in a non-demanding environment, thereby retraining said muscles to support the neck during head motion.

The device and methods according to the invention can be used in conjunction with a therapist or practitioner providing treatment to a patient. A therapist can provide manual therapy and exercise treatments of the cervical, thoracic, and scapular regions, and head during the patient's use of the device. Manual therapy is typically thought of as use of a therapist's hands and body to perform treatment to a patient to improve patient function, relieve symptoms, and address dysfunction. Manual treatments performed by a therapist or practitioner can include joint mobilization and manipulation, soft tissue mobilization, massage, manual resistance to patient motion, stretching, proprioceptive/joint position training, active assisted range of motion, and passive range of motion. In addition to these commonly employed techniques, therapists can provide manual segmental stabilization to a vertebrae, to allow targeting of specific vertebral regions for range of motion, muscle strength, and muscle activation training. Furthermore, in place of a therapist, patients themselves may use their upper extremities to perform the aforementioned manual therapies.

One example method for treating a patient for neck dysfunction comprises, with the patient in one of a supine, prone, or side-lying position, supporting the patient's head on the platform 12 movable in a direction transverse to the neck, and moving the head of the patient while it is supported on the platform. In this example, moving the head may comprise at least one of rotating the head, flexing the head, extending the head, and side bending the head. In another example, connecting the platform to a frame via first and second biasing elements provides resistance to motion in the direction transverse to said neck. When the head is rotated while supported on the platform, the biasing elements provide resistance to the rotation. Moving the head may be performed with use of the user's head and neck muscles, the user's upper extremities applied to the platform, head, or neck, or a combination of the two. With use of the upper extremities, the user may perform self-manual therapies and exercise including joint mobilization and manipulation, soft tissue mobilization, massage, manual resistance to motion, stretching, proprioceptive/joint position training, active assisted range of motion, and passive range of motion.

A further step in this example method may comprise activating cervical muscles by supporting a posterior of the neck on a cervical support, such as the yoke 42 mounted on stanchions 58 and 60 or using cradles 78 or 79. The neck may be supported at a posterior of the neck at one or more cervical vertebrae. Further by way of example, the method comprises applying pressure to the cervical muscles in a direction posterior to anterior or anterior to posterior. Additional steps may include applying a traction to the cervical region as shown in FIGS. 4B, 6C and 6D. Traction may be applied via any cervical vertebrae or the head.

Another example method of treating a patient for neck dysfunction comprises, with the patient in one of a supine, prone, or side-lying position, supporting the patient's head on a cervical support such as the yoke 42 mounted on stanchions 58 and 60 or using cradles 78 or 79 and moving the head of the patient. Moving the head may comprise at least one of rotating the head, flexing the head, extending the head, and side bending the head. Additionally, cervical muscles may be activated by supporting a posterior of the neck. The support may be at a posterior of the neck at one or more cervical vertebrae of the patient. A further step may include applying pressure to the cervical muscles in a direction posterior to anterior or anterior to posterior. Additionally, a traction may be applied to the cervical muscles as shown in FIGS. 4B, 6C and 6D. The method may comprise applying the traction to any cervical vertebrae or the head.

Another example method for treating a patient for neck dysfunction comprises, with the patient in one of a supine, prone, or side-lying position, supporting the patient's head on the platform 12 movable in a direction aligned/parallel to the neck, and moving the head of the patient while it is supported on the platform. In this example, moving the head may comprise at least one of flexing the head and extending the head. Moving the head may be performed with use of the user's head and neck muscles, the user's upper extremities applied to the platform, head, or neck, or a combination of the two. With use of the upper extremities, the user may perform self-manual therapies and exercise including joint mobilization and manipulation, soft tissue mobilization, massage, manual resistance to motion, stretching, proprioceptive/joint position training, active assisted range of motion, and passive range of motion.

What is claimed is:

1. A device for treating neck dysfunction in a neck of a patient, said device comprising:

a platform for supporting a head of said patient while said patient is in a supine, prone or side-lying position;

a bearing mounted on said platform, said bearing permitting motion of said platform along a line of motion;

a frame; and first and second biasing elements, said biasing elements connecting said platform to said frame, said biasing elements providing resistance to a user's lateral motion along said line of motion of said platform while said platform is in motion to activate neck muscles of said patient.

2. The device according to claim 1, wherein said bearing comprises a plurality of wheels mounted on said platform, said wheels rotating about respective axes oriented transversely to said line of motion of said platform.

3. The device according to claim 1, further comprising a track, said bearing interfacing with said track, said track constraining said line of motion of said platform to linear motion.

4. The device according to claim 3, wherein said track comprises a beam.

5. A device for treating neck dysfunction in a neck of a patient, said device comprising:

a platform for supporting a head of said patient while said patient is in a supine, prone or side-lying position;

a bearing mounted on said platform, said bearing permitting motion of said platform along a line of motion;

a frame; and first and second springs, said springs connecting said platform to said frame, said springs providing resistance to a user's lateral motion along said line of motion of said platform.

6. The device according to claim 5, wherein said first and second springs are torsional springs.

7. A device for treating neck dysfunction in a neck of a patient, said device comprising: a platform for supporting a head of said patient while said patient is in a supine, prone or side-lying position; a bearing mounted on said platform, said bearing permitting motion of said platform along a line of motion, the line of motion is transverse to a user's longitudinal axis when the device is in use; a frame; and first and second biasing elements, said biasing elements connecting said platform to said frame, said biasing elements providing resistance to motion along said line of motion of said platform while said platform is in motion to activate neck muscles of said patient.

* * * * *